United States Patent Office

3,705,129
Patented Dec. 5, 1972

3,705,129
EPOXY RESIN COMPOSITION CONTAINING METALLOCENES
Tadashi Murio, Mikio Sato, and Masatzugu Ogata, Hitachi, Japan, assignors to Hitachi, Ltd., and Hitachi Chemical Co., Ltd., Chiyoda-ku and Tokyo, Japan respectively
No Drawing. Filed May 26, 1970, Ser. No. 40,731
Claims priority, application Japan, May 26, 1969, 44/40,186, 44/40,187, 44/40,188, 44/40,191; Nov. 14, 1969, 44/90,810
Int. Cl. C08g 30/10, 30/12
U.S. Cl. 260—47 EC                  14 Claims

ABSTRACT OF THE DISCLOSURE

An epoxy resin composition having an excellent latent curing characteristic at room temperature and a good curing property comprising an epoxy resin and a metallocene or a derivative thereof. Preferred metallocenes include ferrocene and derivatives thereof. Additional curing additives, such as quinone, organic peroxides and phenol, can be employed as desired. The resultant cured epoxy resins display excellent mechanical and electrical properties.

BACKGROUND OF THE INVENTION

This invention relates to an epoxy resin composition having an excellent storage stability, i.e., a long pot-life characteristic, and a good curing property, i.e., excellent latent curing characteristics. More particularly, it relates to epoxy resin compositions containing metallocene or derivatives thereof as a curing agent.

As is well known in the art, a great number of epoxy resin compositions have been used in various applications, such as in connection with castings, adhesives, paints, moldings and the like. In particular, since epoxy resin compositions containing a polybasic anhydride as a curing agent produce cured articles having good electrical and mechanical properties, they have been used very widely. Employed heretofore as curing agents are substances such as maleic anhydride, phthalic anhydride, primary-, secondary- and tertiary-aliphatic polyamines, aromatic polyamines, boron trifluoride-ammine complex salts, phenol resins, polyamide resins and the like. Although, for example, polybasic anhydrides are capable of imparting a good moisture resistance and good mechanical and electrical characteristics to such cured articles, they are unsatisfactory from the point of view of curing. The curing agents of the amine type are poor with respect to their storage characteristic and result in cured articles having poor electrical characteristics, although compositions containing these curing agents do have good curing characteristics.

SUMMARY OF THE INVENTION

Accordingly, it is an object of the present invention to provide a novel epoxy resin composition having excellent latent curing characteristics together with a good curing property.

Another object of the present invention is to provide epoxy resin compositions which have good electrical and mechanical properties in addition to an excellent curing property.

A further object of the invention is to provide epoxy resin compositions having an excellent storage stability, i.e., a long pot-life characteristic.

A still further object of the invention is to provide a process for obtaining epoxy resin compositions having the above advantageous properties.

These and other objects and advantages of the present invention will become apparent to those skilled in the art from a consideration of the following specification and claims.

In accordance with the present invention, it has been found that these objectives can be attained by providing epoxy resin compositions containing metallocene and/or its derivatives, preferably ferrocene and/or its derivatives. Epoxy resin compositions containing these additives have good latent curing characteristics as well as a good curing property. In particular, it has been found that epoxy resin compositions containing metallocene and/or its derivatives and a curing additive selected from the group consisting of quinone organic peroxides and phenol possess the advantageous properties discussed above. Preferably, combinations of ferrocene and/or its derivatives together with the curing additives provide epoxy resin compositions having excellent latent curing characteristics and a good curing property.

DETAILED DESCRIPTION OF THE PREFERRED EMBODIMENTS

Preferred features of the present invention will be apparent from the following description.

(I) Epoxy resins

Substantially all of the epoxy resins known in the art are suitable in the present invention. It is, of course, understood that epoxy resins are synthetic resins obtained by the condensation of, for example, bisphenol A and epichlorohydrin. The linear polymer can be modified by using other polyhydroxy compounds to replace all or a part of the bisphenol A and/or other epoxides, such as those obtained by the epoxidation of unsaturated fatty acids. Polymers of high molecular weight are obtained by the addition of a curing agent. The epoxy resins are thermosetting and, in general, have greater flexibility than the phenolics and greater chemical resistance than the alkyds. Also it will be recognized that the term "epoxy resin" as used herein refers to those resins having more than one vicinal epoxy group or ring. Examples thereof are shown in the following:

(1) epoxy resins synthesized from bisphenol A and epichlorohydrin.
(2) acetone condensates of resorcinol and epichlorohydrin.
(3) epoxy resins synthesized from phenolphthalein and epichlorohydrin.
(4) alicyclic epoxy resins derived from cyclohexene oxides, such as 3,4-epoxy-6-methylcyclohexylmethyl-3′,4′-epoxy-6-methylcyclohexane carboxylate; 3,4-epoxy-cyclohexylmethyl-3′,4′-epoxy-cyclohexane carboxylate; vinylcyclohexene dioxide; and dipentene dioxide.
(5) dicyclopentadiene dioxide epoxy novolacs, such as polyortho-cresol formaldehyde poly (2,3-epoxypropyl) ether, polyphenol formaldehyde poly (2,3-epoxypropyl) ether and epoxidized polyolefin resins.

(II) Polybasic anhydrides

Maleic anhydride, phthalic anhydride, hexahydrophthalic anhydride, dodecenyl succinic anhydride, endomethylenetetrahydrophthalic anhydride, pyromellitic anhydride, methyl endomethylenetetrahydrophthalic anhydride, hexachloro-endomethylenetetrahydrophthalic anhydride, dichloromaleic anhydride, etc.

(III) Metallocenes

Metallocene is represented by the following general formula:

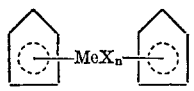

or $(C_5H_5)_2MeX_n$, wherein Me is a metal atom selected from the group consisting of iron, cobalt, nickel and titanium, X is a halogen atom (fluorine, chlorine, bromine or iodine) and $n$ is 0, 1 or 2.

Metallocenes which can be employed in the present invention include, for example, bis (cyclopentadienyl) iron, bis (cyclopentadienyl) cobalt, bis (cyclopentadienyl) nickel, titanocene chloride, etc. Ferrocene, i.e., bis( cyclopentadienyl) iron and its derivatives are preferred because of the excellent latent curing characteristic and good curing property obtained therewith.

Ferrocene derivatives are represented by the following general formula:

wherein R and R' are each radicals such as alkyl, alkenyl, acyl, aryl, cycloalkenyl, cycloalkyl, aldehydo, carboxyl, cyano, nitro or amido groups, and $n$ and $m$ are whole integers from 0 to 4, respectively. Examples thereof include monoethylferrocene, monoacetylferrocene, 1,1'-diacetylferrocene, monophenylferrocene, 1,1'-diphenylferrocene, monovinylferrocene, monoformylferrocene, monocarboxylferrocene, 1,1'-dicarboxylferrocene, monocyanoferrocene, mononitroferrocene, monocyclohexylferrocene, and monocyclohexenylferrocene.

(IV) Organic peroxides

Diisopropyl peroxycarbonate, 2,4-dichlorobenzoyl peroxide, octyl peroxide, lauric peroxide, t-butylperisobutyrate, benzoyl peroxide, cyclohexanone peroxide, di-t-butyl perphthalate, t-butyl peracetate, t-butyl perbenzoate, t-butyl hydroperoxide, methyl ethyl ketone peroxide, di-t-butyl peroxide, p-menthone hydroperoxide.

(V) Quinones

Benzoquinone, naphthoquinone, anthraquinone, chloranil (i.e., 2,3,5,6-tetrachloro-1,4-benzoquinone), 5,6-dichloro-2,3-dicyanoquinone.

(VI) Phenols

Phenol, catechol, resorcinol, pyrogallol, fluoroglycine, oxyhydroquinone, α-naphthol, β-naphthol, cresol, chlorophenol, nitrophenol, aminophenol, 2,3,5,6-tetrachloro-1,4-hydroquinone, 2,4-dinitrophenol.

(VII) Reaction between quinone and ferrocene or its derivatives

A reaction product of quinone and ferrocene or its derivatives is prepared by reaction between these reactants in a hot organic solvent followed by separation of the reaction product from the resulting reaction mixture. This product is used as a curing accelerator for an epoxy resin containing a polybasic anhydride as the curing agent. Although the mixing ratio of quinone to the ferrocene or a derivative thereof is not necessarily limited within a specific range, a ratio of from about 0.1 to 2 moles of ferrocene or its derivatives to one mole of quinone has been found to be preferable in order to attain the objects of the present invention.

Organic solvents to the employed in the reaction described above are, for example, acetic acid, acetone, benzene, toluene, xylene, organic ethers, organic alcohols such as alkanols, chloroform, carbon tetrachloride, carbon disulfide, etc., i.e., inert organic solvents.

(VIII) Preparation of an epoxy resin composition containing quinone and ferrocene In one example, the epoxy resin composition is prepared by mixing an epoxy resin which contains ferrocene and a curing agent comprising quinone. In the case of an alicyclic epoxy resin, 0.1 to 0.6 mole of polybasic anhydride as the curing agent, 0.0005 to 0.05 mole of quinone and ferrocene or its derivatives, respectively, are admixed with one epoxy equivalent of epoxy resin.

(IX) Exemplary modifications

In the following are shown some usages and various combinations of metallocenes and other additives which may be employed within the scope of the present invention.

(A) Use of metallocene as a curing accelerator (i) epoxy resin, polybasic anhydride and metallocene.
(ii) epoxy resin, polybasic anhydride, organic peroxide and ferrocene.
(iii) epoxy resin, polybasic anhydride, organic peroxide, ferrocene and quinone.
(iv) epoxy resin, polybasic anhydride, ferrocene or its derivatives and quinone.
(v) epoxy resin, polybasic anhydride and a reaction product from ferrocene or its derivatives and quinone.
(vi) epoxy resin, polybasic anhydride, ferrocene or its derivatives and phenol.

(B) Use of ferrocene derivatives as a curing agent (i) Epoxy resin, ferrocene or its derivatives and phenol.
(ii) Epoxy resin, a ferrocene derivative and quinone.

(X) Additives

Fillers, pigments, flexibilizers, diluents, mold-separating agents, surface active agents, etc.

(XI) Various exemplary uses for the epoxy resin composition of the invention Materials for casting, molding, dipping (immersing), coating, lamination, filling, adhesives or the like.

EXAMPLES OF THE INVENTION

Further features and advantages of the present invention will be apparent from the following specific examples. These examples are arranged in the following order:

Example 1 relates to epoxy resin compositions which contain a polybasic anhydride and metallocene as a curing accelerator;

Example 2 relates to epoxy resin compositions which contain a polybasic anhydride and as a curing accelerator a combination of ferrocene or its derivatives and quinones;

Example 3 relates to epoxy resin compositions which contain a polybasic anhydride and as a curing accelerator a combination of ferrocene and an organic peroxide;

Example 4 relates to epoxy resin compositions which contain a polybasic anhydride and as a curing accelerator a combination of ferrocene, an organic peroxide and quinones;

Example 5 relates to epoxy resin compositions which contain as a curing agent ferrocene or its derivatives and quinones;

Examples 6 and 7 relate to epoxy resin compositions which are prepared by the mixing of an epoxy resin containing dissolved ferrocene derivatives and a polybasic anhydride containing dissolved quinones;

Example 8 relates to epoxy resin compositions which contain a polybasic anhydride and as a curing accelerator a reaction product of ferrocene derivatives and quinones;

Example 9 relates to epoxy resin compositions which contain a polybasic anhydride and ferrocene derivatives as a curing accelerator; and Example 10 relates to epoxy resin compositions in which a combination of ferrocene or its derivatives and phenols is used as a curing agent or a curing accelerator.

EXAMPLE 1

Composition I 100 parts by weight of UNOX-201 (a thermosetting epoxy resin having a main ingredient of 3,4-epoxy-6-methyl cyclohexylmethyl - 3',4' - epoxy - 6' - methyl-cyclohexane carboxylate, produced by Union Carbide Corporation, USA), 60 parts by weight of "Methyl Hymic Anhydride," referred to herein as MHAc (a trade name for methyl endomethylene tetrahydrophthalic anhydride, produced by Hitachi Chemical Company, Ltd., Japan) and 0.01 mole of ferrocene were homogeneously mixed with each other.

Composition II 100 parts by weight of Epikote 828 a thermosetting epoxy resin having a main ingredient of a diglycidyl ether of bisphenol A, produced by Shell Chemical Company, USA), 100 parts by weight of MHAc and 0.01 mole of cobaltocene were mixed with each other to produce a suitable epoxy resin composition.

Composition III 100 parts by weight of UNOX-201, 60 parts by weight of MHAc and 0.01 mole of nickelocene were mixed with each other.

Composition IV 100 parts by weight of Epikote 828, 89 parts by weight of MHAc and 0.01 mole of titanocene dichloride were homogeneously mixed with each other.

The gelling times at 150° C. and the pot-life (storage life) at 40° C. were measured for each of the compositions described above, respectively. Throughout the examples, the pot-life means the time until the viscosity of the composition becomes ten times that of the initial viscosity (i.e., the viscosity which the composition possesses upon preparation).

The results obtained with the above compositions are shown in Table 1, in which the ratio of pot-life to gel time is the ratio of the pot-life value (hours) to the gel time value (hours).

TABLE 1

| Item | Additive amount (parts by weight) | Gel time (hours) | Pot-life (hours) | Ratio of pot-life to gel time |
|---|---|---|---|---|
| Specimen: | | | | |
| Composition I | 1.86 | 2.87 | 1,310 | 457 |
| Composition II | 1.89 | 0.46 | 175 | 384 |
| Composition III | 1.89 | 1.55 | 970 | 625 |
| Composition IV | 2.49 | 0.88 | 270 | 296 |

COMPARATIVE EXAMPLE 1

Composition I 100 parts by weight of UNOX-201, 60 parts by weight of MHAc and 0.25 part by weight of 2,4,6-tris(dimethylaminomethyl)phenol were mixed with each other.

Composition II 100 parts by weight of Epikote 828, 89 parts by weight of MHAc and 1 part by weight of benzyldimethylamine were mixed with each other.

Composition III 100 parts by weight of UNOX-201 60 parts by weight of MHAc and 5 parts by weight of zinc octoate were mixed with each other.

The test results with respect to gelling time, pot-life and the ratio of pot-life to gel time are shown in Table 2.

TABLE 2

| Item | Additive amount of curing accelerator (parts by weight) | Gel time (hours) | Pot-life (hours) | Ratio of pot-life to gel time |
|---|---|---|---|---|
| Specimen: | | | | |
| Composition I | 0.25 | 2.08 | 49 | 24 |
| Composition II | 1.0 | 0.10 | 19 | 190 |
| Composition III | 5.0 | 0.07 | 36 | 510 |

By comparing the results of Table 1 with those of Table 2, it will be seen that the novel compositions of the present invention have a much greater pot-life than that of the conventional epoxy resin compositions.

EXAMPLE 2

Mixtures comprising, respectively, 100 parts by weight of UNOX-201 and 60 parts by weight of MHAc were prepared; ferrocene, its derivatives and quinones were respectively admixed to these mixtures in the amounts shown in Table 3, giving homogeneous epoxy resin compositions. The test results are shown in Table 3.

TABLE 3

| Comp. | Curing accelerator | Additive amount (parts by weight) | Gel time hours) | Pot life (hours) | Ratio of pot life to gel time |
|---|---|---|---|---|---|
| 1 | Ferrocene / Chloranil | 1.86 / 1.96 | 1.00 | 825 | 825 |
| 2 | Ferrocene / p-Benzoquinone | 1.86 / 0.86 | 0.87 | 1,370 | 1,580 |
| 3 | Diacetylferrocene / Chloranil | 2.70 / 1.96 | 0.21 | 395 | 1,880 |
| 4 | Diacetylferrocene / p-Benzoquinone | 2.70 / 0.86 | 1.30 | 1,350 | 1,040 |
| 5 | 1-ferrocenyl-2-nitropropylene / Chloranil | 2.27 / 1.96 | 0.27 | 490 | 1,810 |
| 6 | Formylferrocene / Chloranil | 2.14 / 1.96 | 0.23 | 530 | 2,300 |
| 7 | Cyclohexenylferrocene / Chloranil | 2.68 / 1.96 | 0.52 | 1,000 | 1,930 |
| 8 | Cyclohexenylferrocene / Chloranil | 2.26 / 1.96 | 0.07 | 485 | 6,940 |

COMPARATIVE EXAMPLE 2

Composition I

Mixtures comprising, respectively, 100 parts by weight of Epikote 828 and 89 parts by weight of MHAc were prepared, and then the different amines shown in Table 4 were admixed therewith. The test results in connection with compositions Nos. 1–3 are shown in Table 4.

Composition II

Mixtures comprising, respectively, 100 parts by weight of UNOX-201 and 60 parts by weight of MHAc were prepared, and then the various amines shown in Table 4 were admixed therewith. The test results in connection with compositions Nos. 4–6 are shown in Table 4.

TABLE 4

| Comp. | Curing accelerator | Additive amount (parts by weight) | Gel time (hours) | Pot-life (hours) | Ratio of pot-life to gel time |
|---|---|---|---|---|---|
| 1 | 2,4,6-tris(dimethyl aminomethyl)phenol | 1.0 | 0.08 | 29 | 360 |
| 2 | Benxyldimehtylamine | 1.0 | 0.12 | 27 | 225 |
| 3 | Tetradecyldimethylbenzyl ammonium chloride | 0.5 | 0.22 | 81 | 370 |
| 4 | Zinc octoate | 5.0 | 0.07 | 36 | 510 |
| 5 | 2,4,6-tris(dimethylaminomethyl)phenol | 1.0 | 2.08 | 49 | 24 |
| 6 | Benzyldimethyl amine | 1.0 | 1.67 | 37 | 22 |

EXAMPLE 3

100 parts by weight of Chisso Nox-201 (a thermosetting epoxy resin having a main ingredient of 3,4-epoxy-6 - methyl cyclohexylmethyl-3',4'-epoxy-6'-methylcyclohexane carboxylate produced by Chisso Company, Japan) and 60 parts by weight of MHAc were mixed with each other, and then ferrocene and various organic peroxides, as shown in Table 5, were admixed therewith. The gelling times at 180° C. and at 150° C. and the pot-life at 40° C. were measured in connection with these epoxy compositions. The test results are shown in Table 5.

TABLE 5

| Comp. | Curing accelerator | Additive amount (parts by weight) | Gel time (hours) at— 180° C. | Gel time (hours) at— 150° C. | Pot-life (hrs.) | Ratio of pot-life to gel time 150° C. |
|---|---|---|---|---|---|---|
| 1 | Ferrocene / Lauryl peroxide | 1.86 / 3.98 | 0.11 | 0.42 | 775 | 1,845 |
| 2 | Ferrocene / Diisopropylbenzene hydroperoxide | 1.86 / 3.88 | 0.40 | 1.67 | 605 | 362 |
| 3 | Ferrocene / t-Butylperbenzoate | 1.86 / 1.94 | 0.20 | 0.91 | 515 | 567 |
| 4 | Ferrocene / Cyclohexanone peroxide | 1.86 / 5.40 | 0.13 | 0.41 | 330 | 825 |

COMPARATIVE EXAMPLE 3

100 parts by weight of Chisso Nox-201 and 60 parts by weight of MHAc were mixed with each other. Then, zinc octoate, stannous octoate and DY-065 (a curing accelerator produced by Ciba Ltd.) were admixed, respectively, with the epoxy resin composition mixtures. The test results are shown in Table 6.

TABLE 6

| Comp. | Curing accelerator | Additive amount (parts by weight) | Gel time (hours) at— 180° C. | Gel time (hours) at— 150° C. | Pot life (hours) | Ratio of pot-life to gel time at 150° C. |
|---|---|---|---|---|---|---|
| 1 | Zinc octoate | 2.0 | 0.18 | 0.75 | 156 | 208 |
| 2 | Stannous octoate | 0.5 | 0.07 | 0.16 | 45 | 265 |
| 3 | DY-065 | 5.0 | 0.25 | 0.92 | 60 | 65 |

EXAMPLE 4

In this example, a mixture of epoxy resin and polybasic anhydride was mixed with a curing accelerator consisting of an organic peroxide, ferrocene and quinone. It has been found, in a further embodiment of the invention, that additive proportions of amounts of organic peroxide: greater than ferrocene: greater than quinone are preferable in obtaining good epoxy resin compositions having excellent properties.

A mixture consisting of 100 parts by weight of Chisso Nox-201 and 60 parts by weight of MHAc was prepared, and then the curing accelerators shown in Table 7 were admixed therewith. The test results are shown in Table 7.

COMPARATIVE EXAMPLE 4

Epoxy resin compositions each consisting of 100 parts by weight of Chisso Nox-201, 60 parts by weight of MHAc and a curing accelerator selected from the group consisting of zinc octoate, stannous octoate and DY-065 (a curing accelerator for epoxy resin which comprises Na-alcoholate) were prepared. The test results obtained therewith are also shown in Table 7.

TABLE 7

| | Curing accelerator | Additive amount (parts by weight) | Gel time (hours) at— 180° C. | Gel time (hours) at— 150° C. | Pot-life (hours) | Ratio of pot-life to gel time at 150° C. |
|---|---|---|---|---|---|---|
| Composition: | | | | | | |
| 1 | Ferrocene or its derivatives / Lauryl peroxide / Chloranil | 1.86 / 7.96 / 1.97 | 0.07 | 0.17 | 1,040 | 6,120 |
| 2 | Ferrocene or its derivatives / Lauryl peroxide / p-Benzoquinone | 1.86 / 7.96 / 0.86 | 0.08 | 0.22 | 880 | 4,400 |
| 3 | Ferrocene / Cyclohexanone peroxide / Chloranil | 1.86 / 5.24 / 1.97 | 0.13 | 0.40 | 950 | 2,375 |
| Comparative: | | | | | | |
| 1 | Zinc octoate | 5.0 | 0.05 | 0.07 | 36 | 514 |
| 2 | Stannous octoate | 0.5 | 0.08 | 0.17 | 45 | 265 |
| 3 | DY-065 | 5.0 | 0.38 | 1.08 | 55 | 51 |

EXAMPLE 5

In this example, ferrocene derivatives and quinones were used as the curing agent. Six different kinds of epoxy resin compositions each comprising 100 parts by weight of Chisso Nox-221 (a thermosetting epoxy resin having a main ingredient of 3,4-epoxycyclohexyl-methyl-(3,4-epoxy)cyclohexane carbonate, produced by Chisso Company, Japan), a ferrocene derivative and chloranil, were prepared. The test results are shown in Table 8.

In addition, two kinds of epoxy resin compositions (composition Nos. 2 and 4 as shown in Table 8) were cured by heating at 100° C. for 12 hours, at 120° C. for 6 hours and at 150° C. for 15 hours. The cured articles thus obtained were subjected to mechanical and electrical tests. The results are shown in Table 9.

TABLE 8

| Comp. | Curing agent | Additive amount (parts by weight) | Gel time (hours) at— 180° C. | Gel time (hours) at— 150° C. | Pot-life (hrs.) | Ratio of pot-life to gelling time at 150° C. |
|---|---|---|---|---|---|---|
| 1 | Ferrocene | 1.86 | 0.33 | 1.75 | 570 | 320 |
|   | Chloranil | 2.46 |   |   |   |   |
| 2 | Monoacetyl ferrocene | 2.27 | 0.05 | 0.22 | 345 | 1,570 |
|   | Chloranil | 2.46 |   |   |   |   |
| 3 | Diacetyl ferrocene | 2.71 | 0.08 | 0.33 | 525 | 1,590 |
|   | Chloranil | 2.46 |   |   |   |   |
| 4 | Cyclohexenyl ferrocene | 1.33 | 0.01 | 0.05 | 60 | 1,200 |
|   | Chloranil | 1.23 |   |   |   |   |
| 5 | Monophenyl ferrocene | 2.61 | 0.10 | 0.42 | <1,500 | <3,500 |
|   | Chloranil | 2.46 |   |   |   |   |
| 6 | Diphenyl ferrocene | 3.38 | 0.10 | 0.42 | <1,500 | <3,500 |
|   | Chloranil | 2.46 |   |   |   |   |

TABLE 9

| Item | Mechanical properties (at 100° C.)[1] Tensile strength (kg./cm.[2]) | Elongation (percent) | Elastic modulus (kg./cm.[2]) | Electrical properties Volume resistivity[1] (Ω-cm.) 60° C. | 100° C. | 140° C. | Dielectric constant[3] 20° C. | 80° C. | 140° C. | Dielectric loss tangent (percent) 20° C. | 80° C. | 140° C. | Heat distortion temperature[4] (° C.) |
|---|---|---|---|---|---|---|---|---|---|---|---|---|---|
| Comp.: |   |   |   |   |   |   |   |   |   |   |   |   |   |
| 2 | 333 | 3.2 | 1.3×10⁴ | 5×10¹ | 1×10¹⁵ | 1×10¹⁴ | 0.2 | 0.4 | 1.1 | 0.002 | 0.004 | 0.011 | 178 |
| 4 | 359 | 2.6 | 1.5×10⁴ | 5×10¹⁵ | 2×10¹⁵ | 3×10¹⁴ | 0.2 | 0.3 | 0.8 | 0.002 | 0.003 | 0.008 | 193 |

[1] In accordance with ASTM 6638-61T.
[2] Tested by application of 100 v. direct current for 1 minute.
[3] Tested by application if 1 kv. sine wave of 60 Hz.
[4] In accordance with ASTM D648-45T(a).

COMPARATIVE EXAMPLE 5

Two kinds of epoxy resin compositions were prepared, one of the compositions consisting of 100 parts by weight of Chisso Nox–221 and 5 parts by weight of a complex compound made from boron trifluoride and piperidine and the other consisting of 100 parts by weight of Chisso Nox–221 and 2 parts by weight of stannous octoate. Specimen No. 3 denotes an epoxy resin composition consisting of 100 parts by weight of Chisso Nox–221, 65 parts by weight of MHAc and 5 parts by weight of DY–065. The test results obtained therewith are shown in Table 10.

Similarly as in Table 9, the mechanical and electrical properties measured with the cured articles produced from these epoxy compositions are set forth in Table 11.

TABLE 10

| Comp. | Gel time (hours) at— 180° C. | Gel time (hours) at— 150° C. | Pot-life (hours) | Ratio of pot-life to gel time at 150° C. |
|---|---|---|---|---|
| 1 | 0.04 | 0.12 | 58 | 483 |
| 2 | 0.17 | 0.47 | 25 | 53 |
| 3 | 0.25 | 0.92 | 60 | 65 | tion. The test results obtained in connection with this epoxy resin composition are shown in Table 12.

TABLE 12

| Comp. | Additive amount of MHAc (mole) | Gel time (hours) at— 180° C. | Gel time (hours) at— 150° C. | Pot-life (hours) | Ratio of pot-life to gel time at 150° C. |
|---|---|---|---|---|---|
| 1 | 0.560 | 0.03 | 0.02 | 90 | 3,000 |
| 2 | 0.197 | 0.10 | 0.05 | 670 | 6,700 |
| 3 | 0.365 | 0.28 | 0.11 | 640 | 2,286 |
| 4 | 0.487 | 0.47 | 0.20 | 840 | 1,787 |

EXAMPLE 7

100 g. of Chisso Nox–221, 65 g. of MHAc (0.365 mole), 1.23 g. of chloranil (0.05 mole) and 1.33 g. of cyclohexenylferrocene (0.005 mole) were mixed with each other in the manner shown in the following:

(1) Cyclohexenylferrocene was dissolved in the Chisso Nox–221, and this solution was mixed with a solution previously prepared by the dissolution of chloranil in MHAc.

(2) Chloranil was dissolved in MHAc to prepare a solution, and then cyclohexenylferrocene was dissolved in this solution. Chisso Nox–221 was dissolved in the resulting solution.

TABLE 11

| Comp. | Mechanical properties (at 100° C.) Tensile strength (kg./cm.[2]) | Elongation (percent) | Elastic modulus (kg./cm.[2]) | Electrical properties Volume resistivity (Ω-cm.) 60° C. | 100° C. | 140° C. | Dielectric constant 20° C. | 80° C. | 140° C. | Dielectric loss tangent (percent) 20° C. | 80° C. | 140° C. | Heat distortion temperature (° C.) |
|---|---|---|---|---|---|---|---|---|---|---|---|---|---|
| 1 | 279 | 1.9 | 1.6×10⁴ | 6×10¹⁴ | 7×10¹² | 2×10¹¹ | 3.1 | 3.2 | 3.4 | 0.6 | 0.7 | 9.0 | 170 |
| 2 | 340 | 5.5 | 1.2×10⁴ | 3×10¹⁴ | 9×10¹² | 2×10¹¹ | 3.6 | 4.8 | 5.2 | 1.0 | 3.3 | 6.5 | 135 |
| 3 | 335 | 2.6 | 1.4×10⁴ | 9×10¹⁴ | 8×10¹² | 2×10¹¹ | 4.0 | 4.5 | 4.9 | 0.8 | 1.3 | 7.5 | 195 |

NOTE.—The tests shown in Table 11 were run in the same manner as those in Table 9.

EXAMPLE 6

0.004 mole of chloranil was dissolved in MHAc to prepare a homogeneous solution, and then 100 g. of Chisso Nox–221 containing 0.004 mole of cyclohexenylferrocene dissolved therein was admixed with the solu- (3) After dissolution of the chloranil in Chisso Nox–221, cyclohexenylferrocene was dissolved in the solution, and then MHAc was added thereto.

Tests were conducted using these three different kinds of compositions. The results are shown in Table 13.

TABLE 13

| Process for preparation | Gel time (hours) at— 150° C. | Gel time (hours) at— 180° C. | Pot-life (hours) | Ratio of pot-life to gel time at 150° C. |
|---|---|---|---|---|
| 1 | 0.10 | 0.05 | 710 | 7,100 |
| 2 | 0.09 | 0.04 | 598 | 6,640 |
| 3 | 0.07 | 0.04 | 284 | 4,060 |

EXAMPLE 8

In this example, a reaction product of a ferrocene derivative and quinone was used as the curing agent. Cyclohexenylferrocene, 1-hydroxyethylferrocene, ferrocenyl aldoxime and phenylferrocene were subjected, respectively, to reaction with chloranil in hot benzene in equimolecular proportions at 80° C. for 3 hours. After the reaction, four different types of products were obtained from the solution by evaporating the solvent under a reduced pressure.

The four kinds of curing agentes thus obtained were mixed, respectively, with 100 parts by weight of Chisso Nox–221 containing 65 parts by weight of MHAc to prepare the desired epoxy resin compositions. The test results are shown in Table 14.

TABLE 16

| Comp. | Additives | Additive amount (parts by weight) | Gel time (hours) at 180° C. | Gel time (hours) at 150° C. |
|---|---|---|---|---|
| 1 | Ferrocene / TCHQ | 1.20 / 1.50 | 0.01 | 0.02 |
| 2 | Monocyclohexenylferrocene / TCHQ | 0.80 / 0.70 | 0.01 | 0.02 |
| 3 | Diphenylferrocene / TCHQ | 1.00 / 1.00 | 0.02 | 0.03 |
| 4 | Diphenylferrocene / TCHQ | 1.30 / 1.00 | 0.02 | 0.03 |
| 5 | Ferrocene / 2,4-dinitrophenol | 0.90 / 0.90 | 0.05 | 0.12 |
| 6 | Ferrocene / TCHQ | 0.05 / 0.25 | 0.03 | 0.10 |
| 7 | Ferrocene / TCHQ | 1.00 / 1.25 | 0.60 | 0.10 |
| 8 | Monocyclohexenylferrocene / TCHQ | 1.30 / 1.25 | 0.22 | 0.43 |
| 9 | Monophenylferrocene / TCHQ | 1.30 / 1.25 | 0.10 | 0.30 |

NOTE.—Composition Nos. 1–5 were prepared by method (1), composition No. 6 was prepared by method (2) and composition Nos. 7–9 were prepared by method (3).

TABLE 14

| Comp. | Curing agent (material for producing the same) | Additive amount (parts by weight) | Gel time (hours) | Pot-life (hours) | Ratio of pot-life to gel time |
|---|---|---|---|---|---|
| 1 | Monocyclohexenyl ferrocene chloranil | 2.56 | 0.09 | 598 | 6644 |
| 2 | 1-hydroxyethyl ferrocene chloranil | 2.38 | 0.12 | 568 | 4733 |
| 3 | Ferrocenylaldoxime chloranil | 2.38 | 0.13 | 528 | 4038 |
| 4 | Monophenylferrocene chloranil | 2.53 | 0.40 | 1600 | 4000 |

EXAMPLE 9

Seven different types of ferrocene derivatives, as shown in Table 15, were admixed with a mixture consisting of 100 parts by weight of Chisso Nox–221 and 65 parts by weight of MHAc. The test results are shown in Table 15.

TABLE 15

| Comp. | Curing accelerator | Additive amount (parts by weight) | Gel time (hours) at— 180° C. | Gel time (hours) at— 150° C. | Pot-life (hours) | Ratio of pot-life to gel time at 150° C. |
|---|---|---|---|---|---|---|
| 1 | Monophenylferrocene | 2.6 | 0.67 | 3.10 | 1,790 | 2,671 |
| 2 | Diphenylferrocene | 3.4 | 0.55 | 3.00 | 2,040 | 3,709 |
| 3 | Monocyclohexenylferrocene | 2.7 | 0.33 | 1.60 | 2,020 | 6,121 |
| 4 | Monoacetylferrocene | 2.3 | 0.27 | 1.50 | 1,540 | 5,704 |
| 5 | Diacetylferrocene | 2.7 | 0.17 | 0.87 | 1,810 | 10,647 |
| 6 | Monoethylferrocene | 2.1 | 0.52 | 1.85 | 1,200 | 2,308 |
| 7 | 1-hydroxyethylferrocene | 2.3 | 0.53 | 3.25 | 1,820 | 2,899 |

EXAMPLE 10

The following compositions were prepared:

(1) Composition consisting of 100 parts by weight of Chisso Nox–221 and a mixture of ferrocene derivatives and phenols as a curing agent.

(2) Composition consisting of 100 parts by weight of Chisso Nox–22 and a mixture of ferrocene and 2,3,5,6-tetrachloro-1,4-hydroquinone (TCHQ).

(3) Composition consisting of 100 parts by weight of Chisso Nox–221, 65 parts by weight of MHAc and a mixture of ferrocene and TCHQ as a curing accelerator.

The test results obtained with these compositions are shown in Table 16.

With regard to cured articles produced from the above compositions under the curing condition of 110° C. for 3 hours, 150° C. for 3 hours and at 180° C. for 15 hours, mechanical and electrical tests were conducted. The test results are shown in Table 17.

TABLE 17

| | Mechanical properties (at 100° C.) | | | Electrical properties | | | | | | | | | |
|---|---|---|---|---|---|---|---|---|---|---|---|---|---|
| | | | | Volume resistivity ($\Omega$-cm.) | | | Dielectric constant [1] | | | Dielectric loss tangent (percent) [1] | | | Heat distortion temperature (° C.) |
| Comp. | Tensile strength (kg./cm.²) | Elongation (percent) | Elastic modulus (kg./cm.²) | 60° C. | 100° C. | 140° C. | 20° C. | 80° C. | 140° C. | 20° C. | 80° C. | 140° C. | |
| 1 | 382 | 2.2 | 1.7×10⁴ | 6×10¹⁵ | 6×10¹⁵ | 3×10¹⁴ | 3.5 | 3.5 | 3.7 | 0.3 | 0.5 | 1.0 | 205 |
| 3 | 359 | 2.6 | 1.5×10⁴ | 5×10¹⁵ | 1.1×10¹⁵ | 4×10¹⁴ | 3.4 | 3.5 | 3.7 | 0.2 | 0.5 | 0.9 | 193 |
| 9 | 272 | 3.5 | 9.7×10³ | 2×10¹⁵ | 3×10¹³ | 4×10¹² | 3.8 | 5.3 | 5.8 | 0.2 | 2.4 | 2.5 | 156 |

[1] Tested by application of current of 60 Hz.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. An epoxy resin composition comprising a thermosetting epoxy resin having more than one vicinal epoxy group and a metallocene having the following general formula:

$$(C_5H_5)_2MeX_n$$

wherein Me is a metal selected from the group consisting of iron, cobalt, nickel and titanium, X is halogen and $n$ is 0, 1 or 2.

2. The epoxy resin composition according to claim 1, further including an organic polycarboxylic anhydride.

3. The epoxy resin composition according to claim 1, wherein said thermosetting epoxy resin is an alicyclic epoxy resin.

4. The epoxy resin composition according to claim 1, wherein said thermosetting epoxy resin is an alicyclic epoxy resin and said metallocene is at least one compound having the following general formula:

$$[(C_5H_{5-n})R_n]Fe[(C_5H_{5-m})R'_m]$$

wherein R and R' are each selected from the group consisting of alkyl, alkenyl, aryl, cycloalkyl, cycloalkenyl, aldehydo, cyano, and nitro groups, and $n$ and $m$ are each whole integers from 0 to 4.

5. The epoxy resin according to claim 1, further containing at least one quinone selected from the group consisting of benzoquinone, naphthoquinone, anthraquinone, chloranil, and 5,6-dichloro-2,3-dicyanoquinone.

6. The epoxy resin composition according to claim 1, further including at least one compound selected from the group consisting of phenol, catecohol, resorcinol, pyrogallol, fluoroglycine, oxyhydroquinone, α-naphthol, β-naphthol, cresol, chlorophenyl, nitrophenol, aminophenol, 3,3,5,6-tetrachloro-1,4-hydroquinone and 2,4-dinitrophenol.

7. An epoxy resin composition comprising a thermosetting epoxy resin having more than one vicinal epoxy group, an organic polycarboxylic anhydride and at least one compound having the general formula:

$$[(C_5H_{5-n})]Fe[(C_5H_{5-m})R'_m]$$

wherein R and R' are each selected from the group consisting of alkyl, alkenyl, aryl, cycloalkyl, cycloalkenyl, aldehydo, cyano and nitro groups, and $n$ and $m$ are each whole integers from 0 to 4.

8. The epoxy resin composition according to claim 7, further including at least one quinone selected from the group consisting of benzoquinone, naphthoquinone, anthraquinone, chloranil and 5,6-dichloro-2,3-dicyanoquinone.

9. The epoxy resin composition according to claim 7, further including an organic peroxide.

10. An epoxy resin composition comprising thermosetting alicyclic epoxy resin having more than one vicinal epoxy group, an organic polycarboxylic anhydride and at least one compound having the following general formula:

$$[(C_5H_{5-n})R_n]Fe[(C_5H_{5-m})R'_m]$$

wherein R and R' are each selected from the group consisting of alkyl, alkenyl, aryl, cycloalkyl, cycloalkenyl, aldehydo, cyano and nitro groups, and $n$ and $m$ are each whole integers from 0 to 4.

11. An epoxy resin composition comprising a thermosetting alicyclic epoxy resin having more than one vicinal epoxy group, an organic polycarboxylic anhydride, at least one compound selected from the group consisting of phenol, catecohol, resorcinol, pyrogallol, fluoroglycine, oxyhydroquinone, α-naphthol, β-naphthol, cresol, chlorophenol, nitrophenol, aminophenol, 3,3,5,6-tetrachloro-1,4-hydroquinone and 2,4-dinitrophenol, and at least one compound having the following general formula:

$$[(C_5H_{5-n})R_n]Fe[(C_5H_{5-m})R'_m]$$

wherein R and R' are each selected from the group consisting of alkyl, alkenyl, aryl, cycloalkyl, cycloalkenyl, aldehydo, cyano and nitro groups, and $n$ and $m$ are each whole integers from 0 to 4.

12. An epoxy resin obtained by curing an epoxy resin composition comprising a thermosetting epoxy resin having more than one vicinal epoxy group and a metallocene having the following general formula:

$$(C_5H_5)_2MeX_n$$

wherein Me is a metal selected from the group consisting of iron, cobalt, nickel and titanium, X is halogen and $n$ is 0, 1 or 2.

13. An epoxy resin composition comprising a thermosetting epoxy resin having more than one vicinal epoxy group; an organic polycarboxylic anhydride; at least one ferrocene compound having the following general formula:

$$[(C_5H_{5-n})R_n]Fe[(C_5H_{5-m})R'_m]$$

wherein R and R' are each selected from the group consisting of alkyl, alkenyl, aryl, cycloalkyl, cycloalkenyl, aldehydo, cyano and nitro groups, and $n$ and $m$ are each whole integers from 0 to 4; at least one quinone selected from the group consisting of benzoquinone, naphthoquinone, anthraquinone, chloranil and 5,6-dichloro-2,3-dicyanoquinone; and an organic peroxide.

14. An epoxy resin composition comprising a thermosetting epoxy resin having more than one vicinal epoxy group; an organic polycarboxylic anhydride; an organic peroxide; and at least one compound having the following general formula:

$$[(C_5H_{5-n})R_n]Fe[(C_5H_{5-m})R'_m]$$

wherein R and R' are each selected from the group consisting of alkyl, alkenyl, cycloalkyl, cycloalkenyl, aldehydo, and nitro groups, and $n$ and $m$ are each whole integers from 0 to 4.

References Cited

UNITED STATES PATENTS 3,186,958   6/1965   Kutner et al. _____ 260—2
3,288,882   11/1966  Stark et al. _____ 260—836

OTHER REFERENCES

Chem. Abstracts 64, 9821d (1966).

WILLIAM H. SHORT, Primary Examiner

E. A. NIELSEN, Primary Examiner

U.S. Cl. X.R.

252—431 R; 260—2 EC, 78.4 EP

UNITED STATES PATENT OFFICE
CERTIFICATE OF CORRECTION

Patent No. 3,705,129          Dated December 5, 1972

Inventor(s) Tadashi MUROI, Mikio SATO and Masatzugu OGATA

It is certified that error appears in the above-identified patent and that said Letters Patent are hereby corrected as shown below:

Column 1,

Line 4, which reads:

Tadashi Murio, Mikio Sato, and Masatzugu Ogata,

Should read:

Tadashi Muroi, Mikio Sato and Masatzugu Ogata,

Signed and sealed this 29th day of May 1973.

(SEAL)
Attest:

EDWARD M. FLETCHER, JR.　　　　　ROBERT GOTTSCHALK
Attesting Officer　　　　　　　　Commissioner of Patents